United States Patent [19]

Belvederi et al.

[11] Patent Number: 5,480,021
[45] Date of Patent: Jan. 2, 1996

[54] PITCH CHANGE FOR AN ORDERLY SUCCESSION OF ELEMENTS

[75] Inventors: Bruno Belvederi, S. Martino di Monte S. Pietro; Salvatore Rizzoli, Bologna, both of Italy

[73] Assignee: G. D. Societa' per Azioni, Bologna, Italy

[21] Appl. No.: 236,961

[22] Filed: May 2, 1994

[30] Foreign Application Priority Data

May 7, 1993 [IT] Italy .................. BO93A0204

[51] Int. Cl.[6] ............................................. B65G 17/46
[52] U.S. Cl. ........................................................ 198/471.1
[58] Field of Search ................... 198/457, 458, 198/467, 471.1, 475.1

[56] References Cited

U.S. PATENT DOCUMENTS

| | | | |
|---|---|---|---|
| 3,303,926 | 2/1967 | Pohl | 198/471.1 |
| 3,521,513 | 7/1970 | Gomann et al. | 198/471.1 X |
| 3,567,011 | 3/1971 | Pinkham | 198/471.1 |
| 4,664,249 | 5/1987 | Gherardi | 198/458 X |
| 5,255,777 | 10/1993 | Pawelko | 198/471.1 |
| 5,267,577 | 12/1993 | Rizzoli et al. | 198/471.1 X |

FOREIGN PATENT DOCUMENTS

| | | |
|---|---|---|
| 1409734 | 10/1975 | United Kingdom . |
| 2091667 | 8/1982 | United Kingdom . |
| WO88/05416A1 | 7/1988 | WIPO . |

*Primary Examiner*—James R. Bidwell
*Attorney, Agent, or Firm*—Klauber & Jackson

[57] ABSTRACT

A device for reducing the pitch between two consecutive elements in a succession of elements, whereby the pitch is changed by feeding the elements by way of a conveyor about a first axis, and changing the distance between the elements and the first axis between a loading station at which the elements are loaded on to the conveyor, and an unloading station at which the elements are unloaded off the conveyor; the distance change being achieved by rotating each element about a respective eccentric second axis traveling with the conveyor.

12 Claims, 2 Drawing Sheets

PITCH CHANGE FOR AN ORDERLY SUCCESSION OF ELEMENTS

BACKGROUND OF THE INVENTION

The present invention relates to a pitch change device for an orderly succession of elements.

The present invention is especially suitable for use in the tobacco industry, particularly for conveying an orderly succession of cigarettes, to which specific reference is made in the following description purely by way of example.

SUMMARY OF THE INVENTION

It is an object of the present invention to provide a pitch change device which is cheap and easy to produce, and provides for a high degree of reliability.

According to the present invention, there is provided a pitch change device for an orderly succession of elements; the device comprising a conveyor for the elements in said succession; a loading station for loading said elements on to the conveyor; and an unloading station for unloading the elements off the conveyor; the conveyor feeding said elements successively along a path extending about a first axis between the loading and unloading stations; characterized by the fact that it also comprises transfer means for supporting said elements along said path, and for changing the distance between said elements and the first axis between said loading and unloading stations.

According to a preferred embodiment of the above pitch change device, the transfer means are mounted on the conveyor so as to rotate, between the loading and unloading stations, about second axes eccentric in relation to the first axis; the transfer means presenting seating means for supporting each element a given distance from a respective said second axis.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Number 1 in the accompanying drawings indicates a pitch change device for changing the pitch between two consecutive elongated elements, in particular cigarettes 2, in a succession 3 of elements 2.

Figure 1:
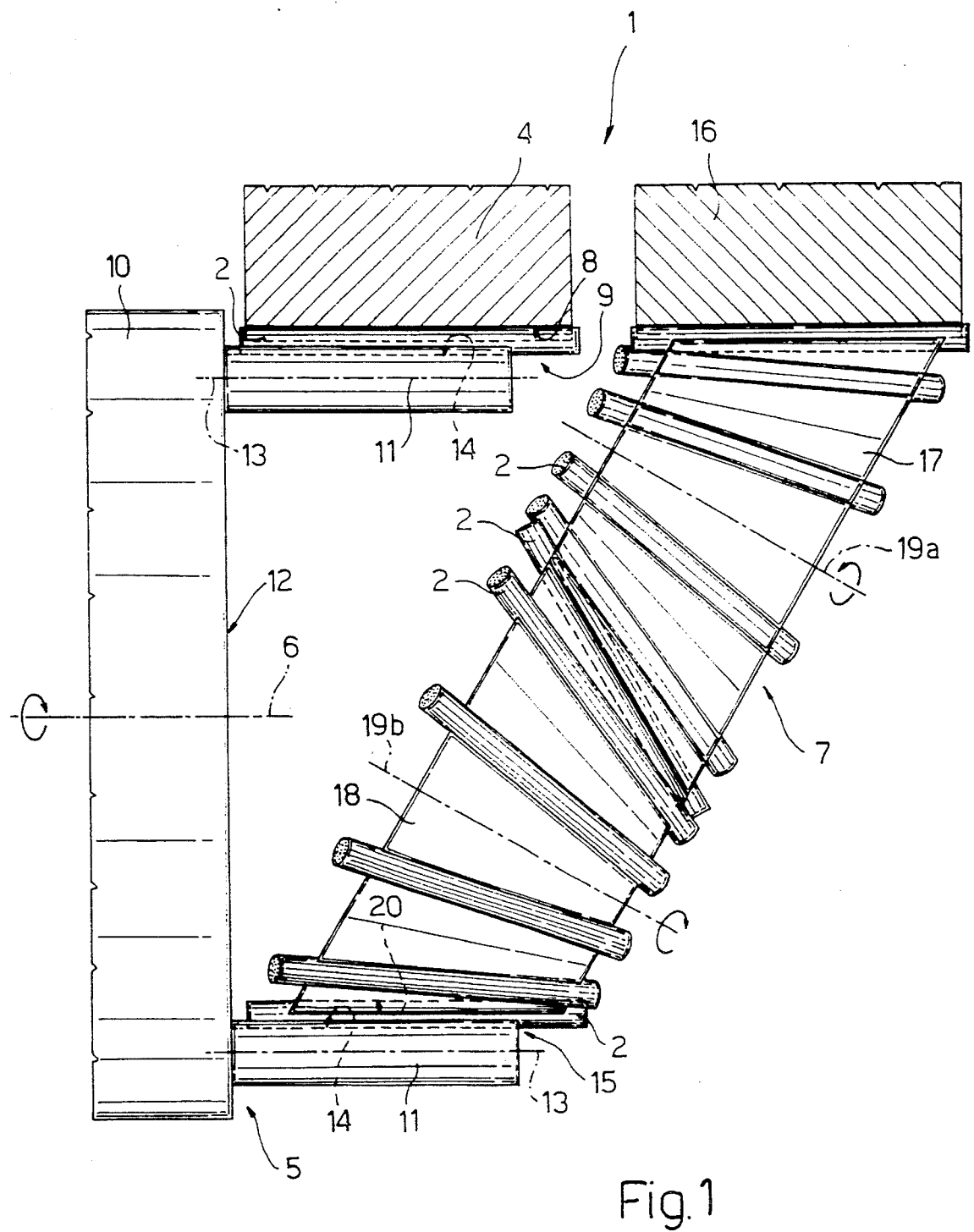
FIG. 1 shows a partial section, with parts removed for clarity, of a preferred embodiment of the pitch change device according to the present invention.
Figure 2:
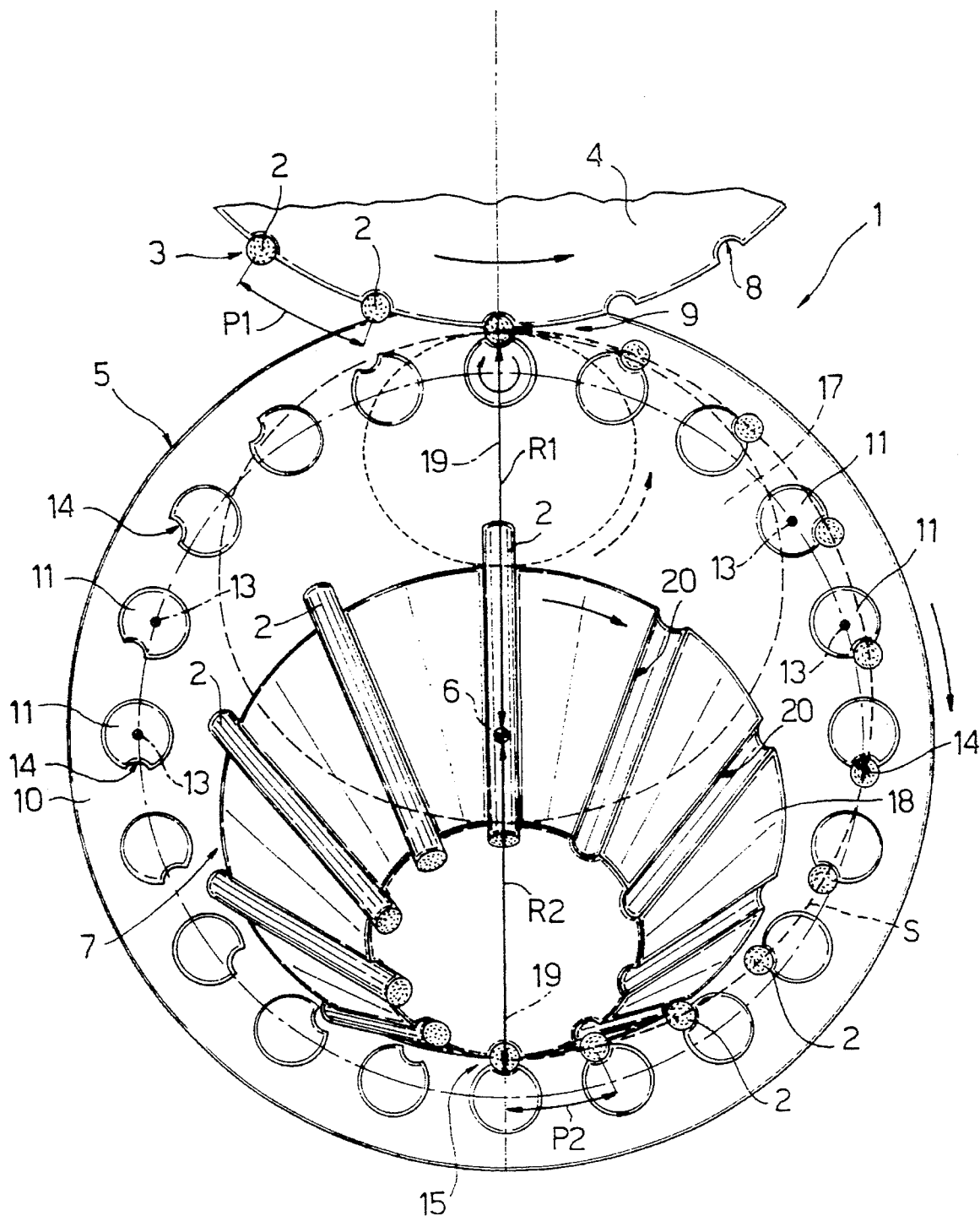
FIG. 2 shows a side view of the FIG. 1 device.

Device 1 comprises a powered input roller 4 rotating anticlockwise (in FIG. 2) about its axis (not shown); a powered drum 5 rotating clockwise (in FIG. 2) about its axis 6 parallel to the axis (not shown) of roller 4; and an output conveyor unit 7. Roller 4 presents a number of suction seats 8 equally spaced about its outer periphery with a given pitch P1, for receiving and retaining by suction respective cigarettes 2; and is tangent to drum 5 at a loading station 9, for successively feeding drum 5 with cigarettes 2 housed inside respective seats 8.

Drum 5 comprises a powered conveyor roller 10 coaxial with axis 6, rotating clockwise (in FIG. 2) at constant speed about axis 6, and supporting a ring of transfer rollers 11 which project from the front surface 12 of roller 10, and rotate clockwise (in FIG. 2) about respective eccentric axes 13 parallel to and all the same distance from axis 6. More specifically, each roller 11 is connected to roller 10 by a known epicyclic drive (not shown) housed inside roller 10, and which provides for rotating each roller 11 through two complete turns about respective axis 13 for each complete turn of roller 10 about axis 6.

Each roller 11 presents a respective peripheral seat 14 parallel to respective axis 13 and for receiving and retaining by suction a respective cigarette 2; and is positioned tangent to roller 4 at station 9, and tangent to unit 7 at an unloading station 15 on the diametrically opposite side of drum 5 in relation to station 9, and in which each roller 11 is rotated 360° in relation to its position in station 9. More specifically, each seat 14 faces radially outwards in relation to roller 10 at station 9, and radially inwards in relation to roller 10 at station 15, so that, between station 9 and station 15, the distance between seat 14 and axis 6 switches from a value R1 to a value R2 less than R1.

Each roller 11, by virtue of rotating about respective axis 13 and being rotated by roller 10 about axis 6, provides for feeding respective cigarette 2 precessionally between stations 9 and 15, so that cigarette 2 travels along a curved path S (FIG. 2) about axis 6.

Unit 7 comprises a powered output roller 16 located, in the example shown, coaxial with and adjacent to roller 4, and rotating in the opposite direction to roller 4; and two powered oppositely-tapered conical rollers 17 and 18 tangent to each other, and of which roller 17 is tangent to roller 16, while roller 18 extends between roller 17 and drum 5, and is tangent to path S at station 15 for receiving cigarettes 2.

Rollers 17 and 18 rotate about respective parallel axes 19a and 19b forming an angle of other than zero with axis 6, and coplanar with both axis 6 and the rotation axes (not shown) of rollers 4 and 16. Each roller 17, 18 presents a number of equally spaced peripheral suction seats 20 parallel to the generating line of respective roller 17, 18, for receiving and retaining respective cigarettes 2.

In actual use, two cigarettes 2, housed inside respective adjacent seats 8, are fed successively by roller 4, and with said spacing P1, to station 9 where they are transferred to two adjacent rollers 11, the seats 14 of which, at station 9, present the same spacing as P1. The two adjacent cigarettes 2 are then rotated about axis 13 of respective rollers 11 and at the same time fed to station 15 where they are removed successively by roller 18 and fed towards roller 16. As they travel along path S between stations 9 and 15, the instantaneous speed and the spacing of the two cigarettes 2 decreases along with the distance between cigarettes 2 and axis 6. More specifically, said spacing assumes a maximum value, equal to P1, at station 9, and a minimum value P2 at station 15, which minimum value P2 is maintained as cigarettes 2 are subsequently fed through unit 7.

We claim:

1. A pitch change device (1) for changing the pitch of elements (2) traveling in an orderly succession (3), said pitch change device (1) comprising:

a conveyor (10) for successively feeding elements (2) along a path (S) extending about a first axis (6) between a loading station (9) and an unloading station (15), said conveyor (10) having transfer means (11) for supporting said elements (2) along said path (S) and for changing the distance between said elements (2) and said first axis (6) between said loading station (9) and said unloading station (15), said transfer means (11) being rotated 360° between said loading station (9) and said unloading station (15), said loading station (9) and said unloading station (15) being located on diametrically opposed sides of said conveyor (10).

2. The device as defined in claim 1, wherein said transfer means (11) are mounted on said conveyor (10) so as to rotate, between said loading station (9) and said unloading station (15), about second axes (13) eccentric in relation to said first axis (6), said transfer means (11) providing seating means (14) for supporting each said element (2) a given distance from a respective said second axis (13).

3. The device as defined in claim 2, wherein said seating means (14) travel between said loading station (9), wherein they are positioned at a maximum distance (R1) from said first axis (6), and said unloading station (15), wherein they are positioned at a minimum distance (R2) from said first axis (6).

4. The device as defined in claim 3, wherein said seating means (14) face radially outward in relation to said first axis (6) at said loading station (9), and wherein said seating means (14) face radially inward in relation to said first axis (6) at said unloading station (15).

5. The device as defined in claim 2, wherein said transfer means comprise a plurality of transfer rollers (11), each rotating about a respective said second axis (13), said seating means comprise a peripheral seat (14) formed on each said transfer roller (11) and parallel to a respective said second axis (13).

6. The device as defined in claim 5, wherein said conveyor comprises a conveyor roller (10) coaxial with said first axis (6) and rotating in a given direction about said first axis (6).

7. The device as defined in claim 6, wherein said transfer rollers (11) rotate about said respective second axes (13) in the same direction as said conveyor roller (10) rotates about said first axis (6).

8. The device as defined in claim 1, further comprising input conveyor means (4) for feeding said elements (2) successively to said loading station (9), and output conveyor means (7) for receiving said elements (2) at said unloading station (15).

9. The device as defined in claim 8, wherein said input conveyor means comprise an input roller (4) and said output conveyor means (7) comprise an output roller (16) coaxial with and adjacent to said input roller (4).

10. The device as defined claim 9, wherein said output conveyor means (7) also comprises at least one pair of tangent, oppositely-tapered conical rollers (17, 18) interposed between said unloading station (15) and said output roller (16).

11. A pitch change device (1) for changing the pitch of elements (2) traveling in an orderly succession (3), said pitch change device (1) comprising:

a conveyor (10) for successively feeding elements (2) along a path (S) extending about a first axis (6) between a loading station (9) and an unloading station (15), said conveyor (10) having transfer means (11) for supporting said elements (2) along said path (S) and for changing the distance between said elements (2) and said first axis (6) between said loading station (9) and said unloading station (15), said transfer means (11) being rotated 360° between said loading station (9) and said unloading station (15).

12. pitch change device (1) for changing the pitch of elements (2) traveling in an orderly succession (3), said pitch change device (1) comprising:

a conveyor (10) for successively feeding elements (2) along a path (S) extending about a first axis (6) between a loading station (9) and an unloading station (15), said conveyor (10) having transfer means (11) for supporting said elements (2) along said path (S) and for changing the distance between said elements (2) and said unloading station (15), said transfer means (11) providing seating means (14) for supporting each said element (2) a given distance from a second axis (13), said seating means (14) being rotated 360° about said second axis (13) between said loading station (9), where said seating means (14) face radially outward in relation to said first axis 96), said loading station (9) and said unloading station (15) being located on diametrically opposed sides of said conveyor (10).

* * * * *